United States Patent
Yoo et al.

[11] Patent Number: 5,843,371
[45] Date of Patent: Dec. 1, 1998

[54] LEAD-FREE SOLDERING MATERIAL HAVING SUPERIOR SOLDERABILITY

[75] Inventors: Choong Sik Yoo, Kyongki-do; Mi Yeon Kim; Duk Yong Yoon, both of Seoul, all of Rep. of Korea

[73] Assignee: Samsung Electro-Mechanics Co., Ltd., Kyongki-do, Rep. of Korea

[21] Appl. No.: 540,694

[22] Filed: Oct. 11, 1995

[30] Foreign Application Priority Data

Jun. 30, 1995 [KR] Rep. of Korea ............... 1995-19010

[51] Int. Cl.$^6$ .................... C22C 13/00; B23K 35/26
[52] U.S. Cl. .................... 420/562; 148/22; 148/23
[58] Field of Search ............... 420/562; 148/22, 148/23

[56] References Cited

U.S. PATENT DOCUMENTS 5,256,370  10/1993  Slattery et al. .................... 420/557

FOREIGN PATENT DOCUMENTS 622151  11/1994  European Pat. Off. ............... 420/562

OTHER PUBLICATIONS

"Evaluation of Lead–Free Solder Joints in Electronic Assemblies," by Artaki and A.M. Jackson, *Journal of Electronic Materials*, vol. 23, No. 8, 1994.

"New, Lead–Free Solders," by M. McCormack and S. Jin, *Journal of Electronic Materials*, vol. 23, No. 7, 1994.

*Primary Examiner*—Sikyin Ip
*Attorney, Agent, or Firm*—Lowe, Price, LeBlanc & Becker

[57] ABSTRACT

A lead-free soldering material for soldering wires of electronic parts is disclosed. The lead-free soldering material is composed of in weight %: 3–4% of Ag, 2–5% of In, 6–14% of Bi and a balance of Sn, and the soldering material shows a superior solderability.

4 Claims, 3 Drawing Sheets

LEAD-FREE SOLDERING MATERIAL HAVING SUPERIOR SOLDERABILITY

FIELD OF THE INVENTION

The present invention relates to a lead-free soldering material used for wiring purposes in electronic components. Particularly, the present invention relates to a lead-free soldering material of tin-silver-indium-bismuth series, in which the solderability is superior.

DESCRIPTION OF THE PRIOR ART

Each of soldering materials has unique properties so as for it to be suitable for the application field. In the usual soldering materials, the melting temperature and solidification temperature ranges are important.

That is, a soldering material which is selected for a special purpose has to have a low melting temperature to the extent that damages should not be caused to the adjacent temperature-sensitive parts. Further, after the completion of the soldering, the soldered material has to have a high melting point range, so that the joined state would be thermally stable.

Further, soldering materials are generally composed of composition systems in which eutectic reactions occur. Therefore, if a soldering material has a special composition other than the relevant eutectic composition, a liquidus line at which the solidification begins after the soldering is crossed to make the liquid phase and the solid phase exist together, and then, a solidus line at which the solidification is completed is reached, this being the solidification temperature range of the special composition. If the solidification temperature range is large, the solidification time is lengthened, and shrinking phenomenon may occur. Therefore, it is important that the soldering composition should have a small solidification temperature range as far as possible. A soldering material having a small solidification temperature range is advantageous during a continuous soldering.

Besides, the wetability as against the base material has to be superior, so that the solderability would be superior, and that the joining strength would be strong after the soldering.

One of the conventional soldering material having the above described properties is the Sn—Pb series alloy. This soldering alloy is superior in the various mechanical and physical properties, and therefore, it is widely used in structures such as plumbings and heat exchangers, and in the general electronic components.

However, the Sn—Pb alloy includes lead which is a non-decomposed metal, and if lead is once ingested by a human body, it is not discharged but accumulated in the human body. For example, the Center for Disease Control of the United States reports that, if the lead concentration in the blood exceeds 10 $\mu$g/dl, it becomes fatal. Particularly, the lead accumulation causes a deterioration of intelligence in children, and that the lead waste contaminates the soil.

Particularly, the traditional soldering materials such as 50Sn—50Pb and 70Sn—30Pb can be used in a wide temperature range, constitute strong mechanical connecting portions, and are useful to soldering copper pipes. However, it was found that lead is dissolved into the water to adversely affect the human health in the long run. Therefore, the use of lead in soldering the pipes which carry the drinking water began to be regulated.

As examples of the regulation of the use of lead and lead-containing composition, the use of lead in the consumer paint was totally prohibited in 1978 in the United States, and the U.S. Environmental Protection Agency (EPA) published a regulation in the Toxic Substance Control Act (TSCA) that there will be a duty of recovering lead-containing materials. Further, the House of Representatives of the United States proposed that a tax of 100–200% be levied for forming a Pb-cleanup fund (HR2479). Further, the Senate formulated the Lead Exposure Act (S-729) proposing a total regulation for the use of industrial lead. Further the U.S. Occupation Security and Health Agency (OSHA) decided the lead standard for regulating the lead concentration which is tolerant in the air and in jobs. This regulation states that the exposure of employees to lead should be minimum under a high lead concentration atmosphere. Thus, in the United States, the use of lead, particularly the use of 50Sn—50Pb was prohibited to the pipe line joining, and the use of lead containing soldering materials was prohibited in the field related to the drinking water. Further, the use of lead containing soldering material for purposes other than the joining of pipe lines was prohibited. This trend is similar in the domestic field.

With the appearance of such regulations against the use of soldering lead, lead-free soldering materials began to be developed. For example, U.S. Pat. No. 5,256,370 discloses a lead-free soldering material for use in joining and sealing electronic components. The lead-free soldering material of the above mentioned patent includes 50–92% of Sn, 1–6% of Ag and 4–35% of In, and it is characterized in that it contains a large amount of indium in the case of using it in electronic components. However, indium is expensive, and particularly, if indium is added by 5% or more, the microstructure contains r-Sn phase. Further, in accordance with the variation of temperature, the r-Sn phase (hexagonal) is shifted to a $\beta$-Sn phase (face centered cubic), with the result that the reliability of the soldered portion is adversely affected.

SUMMARY OF THE INVENTION

The present invention is intended to overcome the above described disadvantages of the conventional techniques.

As a result of a continued study and repeated experiments, the present inventors came to propose the present invention.

Therefore it is the object of the present invention to provide a lead-free soldering material in which indium and bismuth are compositely added to inhibit the formation of a r-Sn and to improve the wetability, so that the soldering material would have a melting point suitable for wiring electronic components, and that the solidification temperature range is narrow, the mechanical properties are superior, and the solderability is superior.

In achieving the above object, the lead-free soldering material is composed of in weight %: 3–4% of Ag, 2–5% of In, 6–14% of Bi and a balance of Sn.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
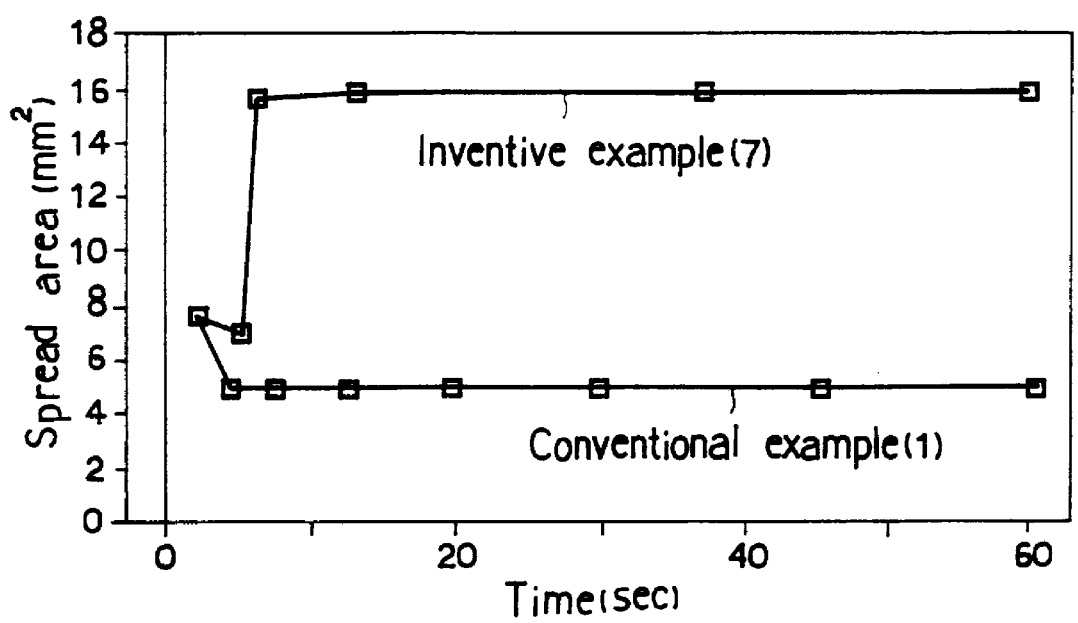
FIG. 1 is a graphical illustration showing the solderability for the conventional soldering material and the soldering material according to the present invention.

The ingredient Ag which is contained in the lead-free soldering material according to the present invention performs the role of improving the wetability and the thermal fatigue property. Its content should be preferably 3–4 weight % (to be indicated by % below). The reason is as follows. If its content is less than 3%, the wetability and the thermal fatigue property is lowered, while if its content is more than 4%, the melting temperature is steeply raised, and cannot contribute to improving the wetability.

Meanwhile, the ingredient In plays the role of improving the wetability and lowering the melting temperature. The reason is as follows. If its content is less than 2%, it becomes non-effective, while if its content is more than 5%, r-Sn phases are formed in the microstructure, with the result that a phase shift occurs from the r-Sn to $\beta$-Sn, thereby lowering the solderability. Therefore, it is desirable to add the ingredient In in a range of 2–5%.

Further, the ingredient Bi together with the ingredient In improves the wetability by inhibiting the growth of the r-Sn phase in the microstructure. If the ingredient Bi is added by 6% or less, its effect is too meager, while if it is added by 14% or more, it widens the melting temperature range. Therefore, the content of Bi should be preferably limited to 6–14%.

The lead-free soldering material having the above described composition can be manufactured by casting in the general method, that is, by putting the improved raw ingredients into a pot or crucible, by heating it in the air and by agitating it. Under this condition, in the case where the melting is carried out in the air, the impurities in the metals or the non-metallic materials in the alloy melt may be reacted with the air to form soluble gases such as soluble nitrogen or soluble oxygen. Consequently, the wetability is aggravated in the base material so as to lower the solderability, or to generate voids in the soldered portion. Therefore, the wetability, the thermal conductivity, the thermal fatigue property and the product reliability may be aggravated.

Therefore, the present invention improves the solderability, the thermal fatigue property and the product reliability by minimizing the soluble gas in the impurities and in the nonmetallic materials during the alloy manufacturing in the following manner. That is, the soldering material according to the present invention is manufactured by melting the alloy ingredients preferably in vacuum or under an inert gas atmosphere, so that particularly the ingredient Bi would be inhibited from being oxidized, thereby minimizing the formation of dross.

The lead-free soldering material of the present invention manufactured in the above described method may be formed into various shapes such as ingot, rectangular, a circular and the like. Further, it may be manufactured in the form of spherical balls of various sizes. Further, it may be mixed with a proper flux to manufacture it into a solder paste.

The lead-free soldering material according to the present invention may be used for soldering electronic components. Further, the solidification temperature range is narrow, and therefore, it is advantageous for carrying out a stepwise soldering. The lead-free soldering material of the present invention is not only superior in the mechanical strength compared with the conventional Sn—Pb soldering material, but also superior in the wetability and the solderability compared with the conventional Sn—Ag—In soldering material.

Now the present invention will be described based on actual examples, but the scope of the present invention is not limited to the specific examples presented here.

<EXAMPLE 1>

A soldering composition as shown in Table 1 below was prepared, and was melted in a induction furnace. Then casting was made, and for the cast soldering material, the solidus line and the liquidus line were measured. The measured results are shown in Table 1 below.

TABLE 1

| Examples | Sn | Ag | In | Bi | Solidus line temp (°C.) | Liquidus line temp (°C.) | Solidification range temp (°C.) |
|---|---|---|---|---|---|---|---|
| Inventive example 1 | 85 | 3 | 5 | 6 | 191.4 | 204.5 | 13.1 |
| Inventive example 2 | 84 | 3 | 5 | 8 | 194 | 205 | 11 |
| Inventive example 3 | 83 | 3 | 5 | 9 | 192 | 204 | 12 |
| Inventive example 4 | 82 | 3 | 5 | 10 | 189 | 202 | 13 |
| Inventive example 5 | 80 | 3 | 5 | 12 | 189 | 205 | 16 |
| Inventive example 6 | 78 | 3 | 5 | 14 | 187.5 | 205 | 17.5 |
| Inventive example 7 | 88.2 | 3.05 | 1.98 | 6.77 | 199 | 213 | 14 |
| Conventional example 1 | 87.7 | 3.2 | 9.1 | — | 202.4 | 207.5 | 5.1 |
| Conventional example 2 | 77.2 | 2.8 | 20 | — | 178.5 | 189.1 | 10.6 |

Composition unit: weight %

As shown in Table 1 above, in the cases of Inventive examples 1–7 in which Bi is added in the Sn—Ag—In series soldering composition, the liquidus line temperature is 202°–213° C., the solidus line temperature is 187°–199° C., and the solidification temperature range is 11°–17.5° C. These features are almost similar to those of the Conventional examples 1–2 in which the composition includes Sn, Ag and In, and in which the liquidus line temperature is 189.1°–207.5° C., the solidus line temperature is 178.5°–202.4° C., and the solidification temperature range is 5.1°–10.6° C.

<EXAMPLE 2>

The wetabilities of the conventional material 1 and the inventive material 7 of Example 1 were measured, and the results are shown in FIG. 1.

As shown in FIG. 1, compared with the conventional example 1 having the composition of Sn—Ag—In, the inventive example 7 in which Bi is added is superior in the wetability in time. Conclusively, the inventive example 7 shows superior solderability compared with the conventional example 1, while both of the examples are similar in their liquefying temperatures and solidifying temperatures.

Figure 2:
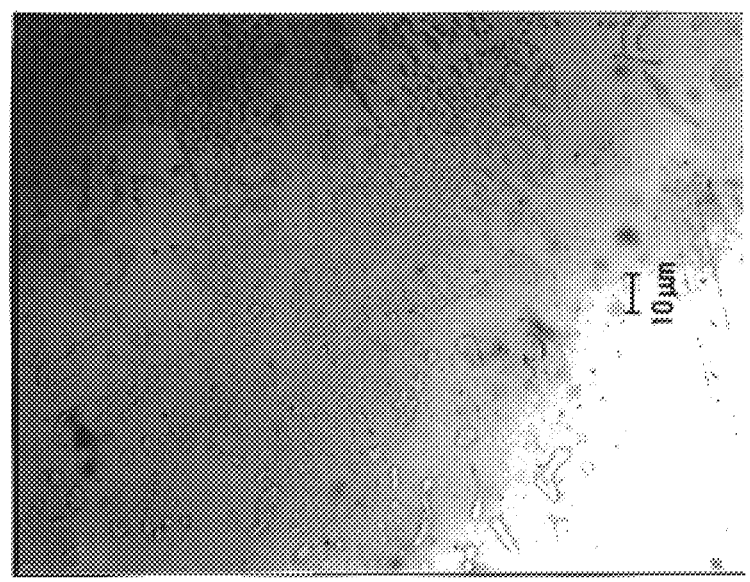
FIG. 2 is a photograph of the lead-free soldering material according to the present invention.

The reason is as follows. That is, as shown in the photograph of FIG. 2 in which the microstructure is viewed, the $Ag_3Sn$ precipitates are more uniform in the lead-free soldering material of the present invention, with the result that the wetability is superior.

<EXAMPLE 3>

Figure 3:
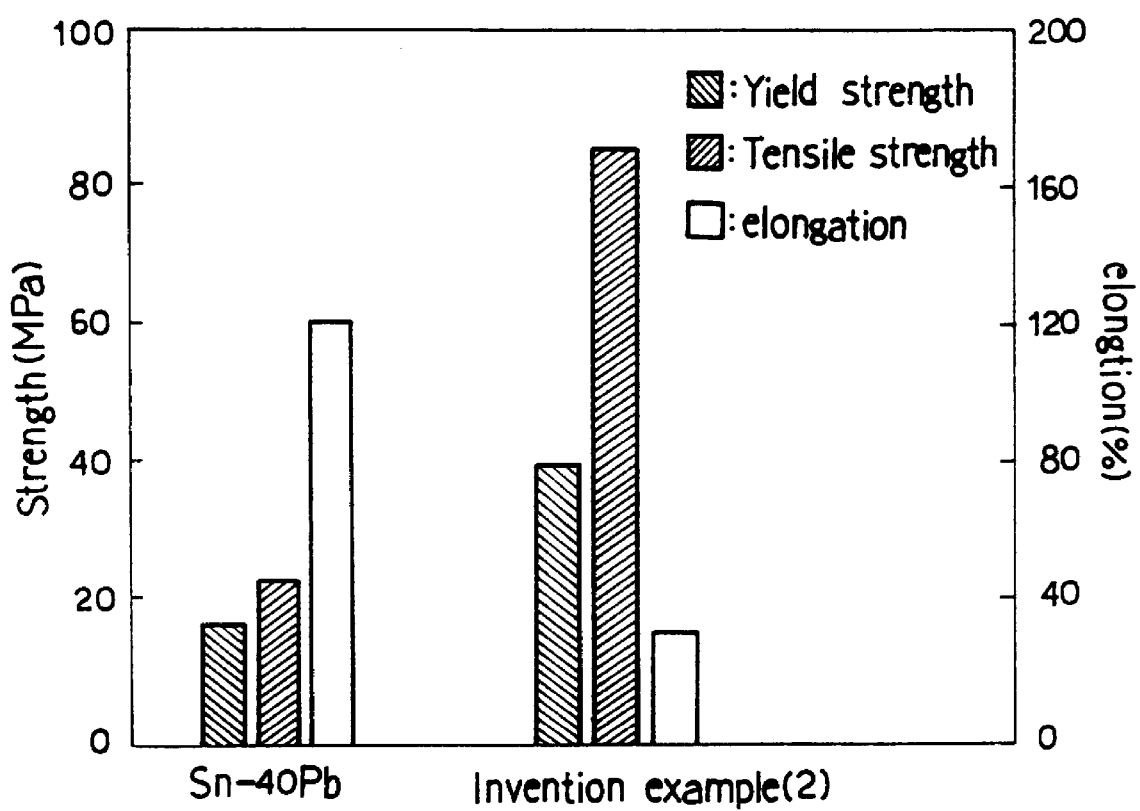
FIG. 3 is a graphical illustration showing mechanical properties of the conventional material and the soldering material according to the present invention.

In order to compare the properties of the lead-free soldering material with the conventional Sn—Pb soldering material, the mechanical properties were comparatively measured for both the inventive example 2 and an Sn—40Pb soldering alloy, and the measured results are shown in FIG. 3.

As shown in FIG. 3, the inventive example 2 shows a superior tensile strength compared with the conventional Sn—40Pb soldering alloy. This means that the lead-free soldering material of the present invention is superior in the joining strength over the conventional Sn—Pb soldering materials.

According to the present invention as described above, the lead-free soldering material of the present invention is superior in the mechanical strength over the conventional Sn—Pb soldering materials. Further, after the soldering, the final joining strength is far more superior compared with the existing ones. Further, since it does not contain lead, the working environment can be improved. Particularly, the wetability of the lead-free soldering material according to the present invention is superior over the conventional Sn—Ag—In lead-free soldering material, while the former shows similar levels of melting temperature and solidification temperature ranges compared with the latter.

What is claimed is:

1. A lead-free soldering material having a superior solderability, consisting essentially of, in weight %, 3–4% of Ag, 2–5% of In, 6–14% of Bi and a balance of Sn.

2. The lead-free soldering material as claimed in claim 1, wherein the material consists essentially of, in weight %, 3–4% of Ag, 2–3% of In, 6–7% of Bi and a balance of Sn.

3. The lead-free soldering material as claimed in claim 1, wherein the material consists essentially of, in weight %, 3–4% of Ag, 4–5% of In, 7–10% of Bi and a balance of Sn.

4. A lead-free soldering material having a superior solderability, consisting essentially of 3–4 wt % of Ag, 2–5 wt % of In, 6–14 wt % of Bi and a balance of Sn, and having a solidus line temperature of 187°–199° C. and a liquidus line temperature of 202°–213° C.

* * * * *